United States Patent Office 3,049,535
Patented Aug. 14, 1962

3,049,535
DIHYDRODESOXYSTREPTOMYCINS AND PROCESS FOR PREPARING SAME
Teijiro Yabuta, Hiroshi Ikeda, and Kenji Shiroyanagi, Tokyo, Hatsuko Ikeda, Fujisawa City, and Itsuo Fujimaki, Mitsuhiko Katayama, Keiichi Tsuji, and Tomonori Sato, Tokyo, Japan, assignors to Kabushiki Kaisha Kagoku Kenkyusho, Tokyo, Japan
No Drawing. Filed Oct. 8, 1958, Ser. No. 765,956
Claims priority, application Japan Jan. 9, 1958
9 Claims. (Cl. 260—210)

The present invention relates to a process for preparing dihydrodesoxystreptomycins by reducing the corresponding streptomycin compound, and more particularly by treating the salts of streptomycins with amalgamated aluminum in the aqueous solution of acid salts of aluminum.

The object of this invention is to prepare high-purified dihydrodesoxystreptomycins, a novel tuberculostatic agent having no side reactions, in the molecules of which the aldehyde group (—CHO) and the tertiary hydroxyl group (—OH) in the streptose chain are converted simultaneously to the primary hydroxyl group (—CH$_2$OH) and the hydrogen atom (—H) respectively.

The streptomycin compounds cited above mean the following three: streptomycin (I), hydroxystreptomycin (II) and mannosidostreptomycin (III), of which the chemical structural formulas are:

Chemical structural formula of streptomycin:

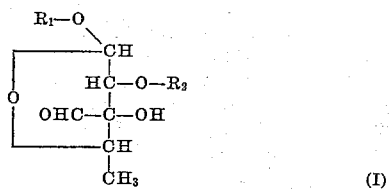
(I)

Chemical structural formula of hydroxystreptomycin:

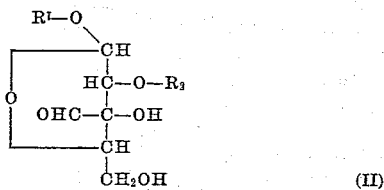
(II)

Chemical structural formula of mannosidostreptomycin:

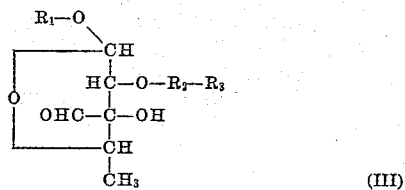
(III)

R$_1$ represents streptidine residue as follows:

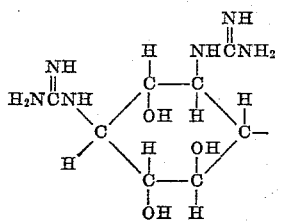

R$_2$ represents N-methyl-L-glucosamine residue as follows:

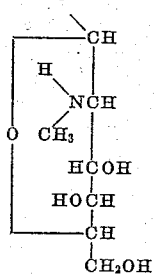

R$_3$ represents D-mannose residue as follows:

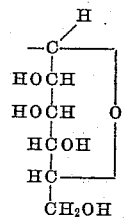

By applying the reduction method as indicated by this invention, we can obtain dihydrodesoxystreptomycin (IV) from streptomycin, dihydrodesoxyhydroxystreptomycin (V) from hydroxystreptomycin and dihydrodesoxymannosidostreptomycin (VI) from mannosidostreptomycin. Chemical structural formulas of these reduction products are given below.

Chemical structural formula of dihydrodesoxystreptomycin:

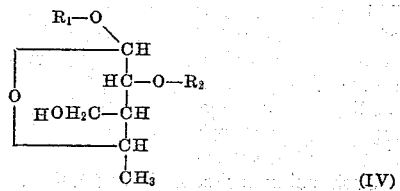
(IV)

Chemical structural formula of dihydrodesoxyhydroxystreptomycin:

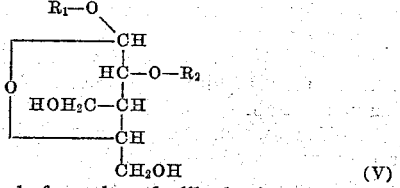
(V)

Chemical structural formula of dihydrodesoxymannosidostreptomycin:

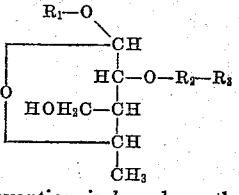

The present invention is based on the discovery that, by treating streptomycin salts with amalgamated aluminum in the aqueous solution of acid salts of aluminum, the above reduction can be carried out.

Next, we shall explain about the mechanism of the present invention.

In the component molecules of the above-mentioned streptomycins, the aldehyde group (—CHO) and the tertiary hydroxyl group (—OH) adjacent to the third carbon atom in streptose are reduced at the same time by the present process for reduction, and the former becomes primary hydroxyl group (—CH$_2$OH) while the latter is split off of oxygen atom and becomes hydrogen atom (—H). That is to say,

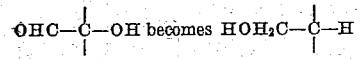

In other words, by the present method of reduction, two hydrogen atoms enter into the aldehyde group in the streptomycins and simultaneously the tertiary hydroxyl group is split off of its oxygen. For this reason, the above-mentioned reduction products are as a whole called dihydrodesoxystreptomycins.

Later on, after animal and clinical tests, it has been found that dihydrodesoxystreptomycins are very potent as a tuberculostatic agent having no side reactions.

The present inventors have previously described in U.S. Patent 2,803,650 the preparation of dihydrodesoxystreptomycins by adding acid to the solution of streptomycin salts and by reducing it in the presence of amalgamated aluminum at 10–50° C. maintaining the pH of the solution at 2.0–2.5. Furthermore, in U.S. Patent 2,837,510, the inventors have described the preparation of dihydrodesoxystreptomycins by reducing the solution of streptomycin salts in the presence of amalgamated aluminum maintaining the pH of the solution at 1.5–2.4 at the early stage of the reaction, and at 2.7–3.6 when the reaction has become vigorous during the process.

As a result of further researches, the inventors have admitted that the method described in the above-mentioned U.S. Patents 2,803,650 or 2,837,510 is accompanied by a disadvantage in the industrial manufacture, and have recently come to invent a superior method of manufacture, described in detail.

According to the method described in the above-mentioned U.S. Patents 2,803,650 or 2,837,510, in order to maintain the pH of the reaction mixture at a limited value during the process, pouring of acid to the reaction mixture must be continued all through the time of reaction. This procedure to adjust the pH by the incessant addition of acids is a very troublesome one in the manufacture on an industrial scale. Unless this is accurately practiced, the obtained dihydrodesoxystreptomycin will be of an impure quality. (This is caused by the increase of dihydrostreptomycin yielded as a by-product.) So, this must be carried out at all events.

Such being the case, if this adjustment of pH by the addition of acid could be dispensed with at reaction, the reaction would be practiced industrially with much ease.

In order to attain the above-mentioned purpose, the following have been considered as sine qua non:

(1) That which can always maintain the pH of the reaction mixture within the range of 2.0–2.6 without adding acids at all.

(2) That which can conveniently be employed in the procedure for collection of dihydrodesoxystreptomycins subsequent to the reaction of producing the same.

From the result of the various investigations conducted on the basis of the foregoing considerations, it has been discovered that the above-mentioned purpose can be accomplished by carrying out the reduction of the streptomycin compound by means of amalgamated aluminum in contact with a solution of the streptomycin compound dissolved in an aqueous solution of an aluminum salt, particularly aluminum sulfate or aluminum chloride.

The result of our experiments is as described below.

The aluminum sulfate as a commercial commodity can be represented by the molecular formula of $$Al_2(SO_4)_3 \cdot 18H_2O$$

The relation between the temperature and pH of the aqueous solution (10%–70%) of this substance is as per the following table:

[pH value of aluminum sulfate Al$_2$(SO$_4$)$_3$.18H$_2$O at a prescribed concentration. The figures in the brackets ( ) denote the percentage of the concentration for Al$_2$(SO$_4$)$_3$]

| Concentration (Percent) — Temperature (° C.) | 70 (35.9) | 50 (25.65) | 40 (20.55) | 30 (15.4) | 20 (10.25) | 10 (5.13) | 5 (2.56) |
|---|---|---|---|---|---|---|---|
| 5 | | | | 2.83 | 2.99 | | 3.31 |
| 10 | 1.63 | 2.30 | 2.43 | 2.70 | 2.87 | 3.02 | 3.20 |
| 15 | 1.53 | 2.20 | 2.30 | 2.55 | 2.70 | 2.90 | 3.07 |
| 20 | 1.43 | 2.11 | 2.20 | 2.44 | 2.57 | 2.75 | 2.93 |
| 25 | 1.36 | 2.01 | 2.08 | 2.32 | 2.47 | 2.66 | 2.82 |
| 30 | 1.30 | 1.91 | 2.00 | 2.23 | 2.36 | 2.57 | 2.71 |
| 35 | 1.24 | 1.83 | 1.91 | 2.14 | 2.26 | 2.48 | 2.61 |
| 40 | 1.18 | 1.75 | 1.83 | 2.05 | 2.16 | 2.39 | 2.52 |
| 45 | 1.13 | 1.67 | 1.74 | 1.97 | 2.07 | 2.30 | 2.43 |
| 50 | 1.08 | 1.59 | 1.65 | 1.86 | 1.98 | 2.19 | 2.34 |
| 55 | 1.05 | 1.49 | 1.53 | 1.76 | 1.87 | 2.08 | 2.25 |
| 60 | 1.01 | 1.38 | 1.43 | 1.65 | 1.74 | 1.98 | 2.16 |
| 65 | 0.95 | 1.24 | 1.31 | 1.52 | 1.60 | 1.84 | 2.00 |

As the table shows, pH value differs according to the difference of concentrations, however, as a tendency, pH decreases in proportion to the rise of temperature.

When the reaction takes place actually, pH of the reaction mixture becomes slightly higher than pH of the above-mentioned aqueous solution of aluminum sulfate alone on account of the presence of amalgamated aluminum and streptomycin. However, the extent of this difference is as a rule within the range of about 0.5.

As mentioned above, the aqueous solution of aluminum sulfate is the most appropriate one to be employed in this reaction. Furthermore, in obtaining crystals of dihydrodeoxystreptomycin from the reaction mixture after streptomycin is undergone this reaction, the addition of barium hydroxide to the solution will change sulfate ion into barium sulfate and aluminum ion into aluminum hydroxide, and they will both be separated out because of their insoluble nature, so, by filtering them off, dihydrodesoxystreptomycin can easily be crystallized out from the filtrate.

Thus, we have discovered that, by employing aluminum sulfate, not only pH can be satisfied at the time of reaction, but the treatment after the reaction can be executed industrially with much advantage.

Again, according to the researches made by the present inventors, aluminum chloride can be employed instead of aluminum sulfate. In this case, it is suitable for use although pH is slightly lower than when aluminum sulfate is employed. Also, after the reaction, chloride ion can be removed as silver chloride by the addition of silver carbonate to the reaction mixture and, likewise, aluminum ion and carbonate ion can be removed by being separated out as aluminum hydroxide and barium carbonate by the addition of barium hydroxide.

It will be convenient to use aluminum sulfate for reducing sulfate of streptomycins, and aluminum chloride for reducing hydrochloride of streptomycins or streptomycin hydrochloride calcium chloride complex salt.

Moreover, describing for the sake of information, the object aimed at in the present invention is fulfilled by employing acid salts, and salts of other metals are not proper to be used as substitutes, because, e.g. with respect to sodium sulfate, sodium chloride, magnesium sulfate, magnesium chloride, zinc sulfate, zinc chloride, calcium chloride, etc., pH of their aqueous solution is of neutral nature, or, even at the temperature of 50–60° C., it becomes only very slightly lower than 7. In addition, in these cases, removal of metallic ion will be difficult when obtaining dihydrodesoxystreptomycins from the reaction mixture after reaction.

As mentioned above, the facts discovered by the inventors as a result of their researches are the most important points that constitute the present invention. Considering from this point, such a disadvantageous industrial operation as the incessant procedure to maintain the pH of the reaction mixture at a prescribed value by addition of acids during reaction, about which is described in U.S. Patents 2,803,650 or 2,837,510, can be dispensed with altogether by synthetic application of the above-mentioned facts discovered by the present inventors, and production of dihydrodesoxystreptomycin in a way which is very simple industrially with no necessity for adjusting pH during the reaction of reduction becomes possible.

The object of this invention is to provide a new method for industrially reducing streptomycins into dihydrodesoxystreptomycins by the application of the discovered facts as mentioned above.

In effecting the present invention, either the sulfate of streptomycins is dissolved in the aqueous solution of aluminum sulfate of a prescribed concentration or the hydrochloride of streptomycins or streptomycin hydrochloride calcium chloride complex salt is dissolved in aluminum chloride of a prescribed concentration. Amalgamated aluminum is then added and is reacted at the temperature maintained at 50–60° C. As soon as the maltol assay shows that the residual streptomycins in the reaction mixture have become below 1–2%, the reaction is finished, and the reaction mixture is filtered. Then, in case aluminum sulfate is used, barium hydroxide is added to the filtrate and the resultant precipitates of barium sulfate and aluminum hydroxide are filtered; or, in case aluminum hydrochloride is used, silver carbonate is added to the filtrate and the precipitate of resultant silver chloride is removed and concentrated the filtrate; or acetone is poured to the filtrate. Then, the crystals of free base of dihydrodesoxystreptomycins are separated out. By freeze drying of the aqueous solution which is obtained by the neutralization of the crystals of the above-mentioned free base with dilute sulfuric acid, or by adding methanol to this solution, sulfate of dihydrodesoxystreptomycins can be obtained.

Both hydrochloride and phosphate of dihydrodesoxystreptomycins are also obtainable by neutralizing the above-mentioned free base with dilute hydrochloric acid or dilute phosphoric acid respectively.

As to the concentration of the aqueous solution of the above-mentioned aluminum sulfate or aluminum hydrochloride to be used in the present invention, that of 2.5–35% for $Al_2(SO_4)_3$ may be adopted, as is seen from the above-mentioned table. However, in practice, the solution of diluted concentration is desirable because this will simplify the operation of removing sulfate ion, chlor ion and aluminum ion after the reaction, and at the same time, this will raise the yield. In the actual process, it has been found that the concentration within the range of 5–20% for $Al_2(SO_4)_3$ realizes the best result.

In the process of the present invention, it is desirable to maintain the reaction temperature generally at 50–60° C. The reaction may proceed at lower temperatures, but it will not proceed rapidly enough, and moreover, there is a defect that the rate of mixture of dihydrostreptomycin in the resulting dihydrodesoxystreptomycin increases, and at higher temperatures streptomycins in the reaction mixture may be in danger of being decomposed during reaction.

In applying the method for reduction under the present invention, the purpose may be perfectly attained by using streptomycins as starting material which are only 50–60% in quality, to say nothing of streptomycins of high quality.

The fact that the starting material of impure quality can be used is a great advantage in simplifying the administration of factory and reducing the cost of production. However, it must be noted that while from the starting streptomycins of high purity the pure salt of dihydrodesoxystreptomycins can be immediately obtained by making the pH of the reaction mixture neutral, us eof streptomycins of impure quality as starting material necessitates, after the reaction, the removal of metallic ion and acid ion in the reaction mixture and the separation of crystals of free base of dihydrodesoxystreptomycins, and after this, these crystals are neutralized with acids and then the pure salts of them are obtained.

As mentioned above, according to the present invention, salt of streptomycins is dissolved in the aqueous solution of acid salts of aluminum, e.g., aluminum sulfate or aluminum hydrochloride, and by reducing the solution in the presence of amalgamated aluminum, dihydrodesoxystreptomycins of pure quality which is valuable as tuberculostatic agent can be obtained.

The following examples illustrate methods of carrying out the present invention, but it is to be understood that these examples are given by way of illustration and not of limitation.

*Example 1*

70 g. of streptomycin sulfate of high purity (potency: 75 u./mg., purity: 94.7%) is dissolved in 335 ml. of the aqueous solution of 20% $Al_2(SO_4)_3 \cdot 18H_2O$ (10.25% for $Al_2(SO_4)_3$. To this is added 8 g. of amalgamated aluminum and is reacted under agitation. The temperature of the reaction mixture is maintained at 50–60° C. After 3 hours of reaction, the maltol assay shows that the quantity of streptomycin contained in the reaction mixture is 5%. After this time, 8 g. of amalgamated aluminum is further added, and by reacting for 2 hours at 45–50° C., the content of residual streptomycin is held below 1%. After the reaction is finished, the solution is diluted with 700 ml. of distilled water, to which is added hot aqueous solution of barium hydroxide to neutralize the solution and filtered. The residue is washed twice with distilled water, and the filtrate and washings are combined and concentrated under reduced pressure. 250 ml. of the concentrate is added drop-wise to 1,500 ml. of methanol, and dihydrodesoxystreptomycin sulfate is precipitated, filtrated, washed with methanol and dried.

Yield: 61.5 g., 97.2%; dihydrostreptomycin contents: 2.18% (therefore, purity of dihydrodesoxystreptomycin is 97.82%); potency: 830 u./mg.

*Analytical result.*—Calculated for
$C_{21}H_{41}N_7O_{11} \cdot 3/2H_2SO_4$ 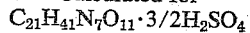
C=35.29%, H=6.21%, N=13.72%
Found: C=35.68%, H=6.31%, N=13.41%.

*Example 2*

As starting material, 90 g. of streptomycin sulfate of impure quality (potency: 520 u./mg., purity: 65.2%) is employed. After reaction is executed exactly in the same way as in Example 1, hot aqueous solution of barium hydroxide is added to the reaction mixture, and aluminum and sulfate ions are removed. The filtrate is mixed with the equal quantity of acetone, and after allowing to cool overnight, the separated and solidified crystals of free base of dihydrodesoxystreptomycin are collected by filtration, neutralized with 10% sulfuric acid, filtered after precipitated from methanol, dried and then dihydrodesoxystreptomycin sulfate is obtained. (In this case, neutralization can be effected with methanol hydrochloric acid. Then, the solution is added dropwise to acetone, and by collecting the resultant precipitates and by drying them, dihydrodesoxystreptomycin hydrochloride can be obtained.)

Yield: 49.5 g., 89.2%; dihydrostreptomycin contents: 1.55% (therefore, purity of dihydrodesoxystreptomycin is 98.45%); potency: 845 u./mg.

*Example 3*

70 g. of hydroxystreptomycin of high quality (potency: 705 u./mg.) is dissolved in aqueous solution of 30% $Al_2(SO_4)_3 \cdot 18HO_2$ (15.4% for $Al_2(SO_4)_3$). To this mixture 10 g. of amalgamated aluminum is added and reduction is effected under agitation. After continual reaction for 5 hours maintaining the temperature at 50–60° C., hydroxystreptomycin contents of the solution becomes below 1% and the added amalgamated aluminum is almost dissolved. After the reaction is finished, the solution is diluted with double quantity of distilled water. To this solution hot aqueous solution of barium hydroxide is added to neutralize the solution and filtered. The residue is washed twice with distilled water. The filtrate and washings are combined and concentrated under reduced pressure at 45–50° C. 250 ml. of the concentrate is added dropwise to 1,500 ml. of methanol, and dihydrodesoxyhydroxystreptomycin sulfate is precipitated, collected by filtration and dried.

Yield: 62.5 g., 95.0%; dihydrohydroxystreptomycin contents: 3.1% (therefore, purity of dihydrodesoxyhydroxystreptomycin is 96.9%); potency: 750 u./mg.

*Analytical result.*—Calculated for
$C_{21}H_{41}N_7O_{12} \cdot 3/2H_2SO_4$
$C=34.52\%$, $H=6.07\%$, $N=13.42\%$
Found: $C=34.87\%$, $H=6.15\%$, $N=13.31\%$

Example 4

As staring material, 90 g. of hydroxystreptomycin of impure quality (potency: 500 u./mg.) is employed. After the reaction is executed exactly in the same way as in Example 3, hot aqueous solution of barium hydroxide is added to the reaction mixture, and aluminum and sulfate ions are removed. The filtrate is mixed with the equal quantity of acetone, and after allowing to cool overnight, the separated and solidified crystals of free base of dihydrodesoxyhydroxystreptomycin are collected by filtration and neutralized with 10% sulfuric acid. The neutralized solution is precipitated from sixfold quantity of methanol, collected by filtration, dried and then dihydrodesoxyhydroxystreptomycin sulfate is obtained.

Yield: 54.0 g., 91.2%; dihydrohydroxystreptomycin contents: 20% (therefore, purity of dihydrodesoxyhydroxystreptomycin is 98%); potency: 760 u./mg.

Example 5

70 g. of mannosidostreptomycin sulfate of high purity (potency: 230 u./mg.) is dissolved in 200 ml. of aqueous solution of 15% $Al_2(SO_4)_3 \cdot 18H_2O$ (7.7% for $Al_2(SO_4)_3$). To this mixture 7.0 g. of amalgamated aluminum is added and reacted under agitation. After 6 hours of continual reduction, maintaining the temperature at 50–60° C., mannosidostreptomycin contents in the solution becomes below 1% and the added amalgamated aluminum is almost dissolved. After the reaction is finished, the solution is diluted with about double quantity of distilled water. To this solution hot aqueous solution of barium hydroxide is added to neutralize the solution and filtered. The residue is washed with water completely, and being combined with the filtrate, are concentrated under reduced pressure at 45–50° C. The concentrate is added dropwise to 1,200 ml. of methanol, and dihydrodesoxymannosidostreptomycin sulfate is precipitated, filtered and dried.

Yield: 63.0 g., 92.0%; dihydromannosidostreptomycin contents: 3.1% (therefore, purity of dihydrodesoxymannosidostreptomycin is 96.9%); potency: 235 u./mg.

*Analytical result.*—Calculated for
$C_{27}H_{51}O_{16}N_7 \cdot 3/2H_2SO_4$
$C=36.98\%$, $H=6.21\%$, $N=11.18\%$
Found: $C=37.12\%$, $H=6.36\%$, $N=11.35\%$

Example 6

As starting material, 90 g. of mannosidostreptomycin sulfate of impure quality (potency: 150 u./mg.) is used. The reaction is executed exactly in the same way as in Example 5. After the reaction is finished, hot aqueous solution of barium hydroxide is added to the solution and aluminum and sulfate ions are removed. Then the same quantity of acetone is added to the filtrate and allowed to cool overnight. The separated and solidified crystals of free base of dihydrodesoxymannosidostreptomycin are filtered, neutralized with 10% sulfuric acid. By adding the neutralized mixture to sixfold quantity of methanol, a precipitate results. By filtering, washing and drying this precipitate, dihydrodesoxymannosidostreptomycin sulfate is obtained.

Yield: 49.5 g., 88.0%; dihydromannosidostreptomycin contents: 2.5% (therefore, purity of dihydrodesoxymannosidostreptomycin is 97.5%); potency: 240 u./mg.

Example 7

70 g. of streptomycin sulfate of high purity (potency: 797 u./mg., purity: 94.8%) is dissolved in 300 ml. of aqueous solution of 10% $AlCl_3 \cdot 6H_2O$ (5.53% for $AlCl_3$). 8.5 g. of amalgamated aluminum is added to this solution and reacted under agitation. After continuous reaction for 6 hours maintaining the temperature of the reaction mixture at 50–55° C., the streptomycin contents of the solution becomes below 1%, and the added amalgamated aluminum is almost dissolved. After the reaction is finished the solution is diluted with the equal quantity of distilled water, 75 g. of powdered silver carbonate is added under stirring to remove aluminum hydrochloride as the precipitates of silver chloride and aluminum hydroxide and filtered. The residue is washed with distilled water. The washings, being combined with the above filtrate, are concentrated under reduced pressure until they take syrup-like state. The syrup is dissolved in 300 ml. of dehydrated methanol, and is added dropwise to 3,000 ml. of dehydrated acetone, and dihydrodesoxystreptomycin hydrochloride is precipitated. The precipitate is filtered, washed and dried.

Yield: 60.0 g., 92.5% dihydrostreptomycin contents: 2.5% (therefore, purity of dihydrodesoxystreptomycin is 97.5%); potency: 860 u./mg.

*Analytical result.*—Calculated for $C_{21}H_{41}N_7O_{11} \cdot 3HCl$: $C=37.26\%$, $H=6.55\%$, $N=14.48\%$. Found: $C=37.38\%$, $H=6.65\%$, $N=14.58\%$.

Example 8

As starting material, 90 g. of impure streptomycin hydrochloride (potency: 560 u./mg., purity: 66.5%) is employed. The reaction is effected exactly in the same way as in Example 7. After the reaction is finished, the solution is diluted with the equal quantity of distilled water. To this solution is added 200 g. of powdered silver carbonate and thoroughly stirred, and chlor and aluminum ions are removed by precipitation. After filtration, the residue is thoroughly washed with distilled water. The filtrate and washings are combined and concentrated under reduced pressure. To 250 ml. of the concentrated solution is added hot aqueous solution of barium hydroxide to remove carbonate ion. To 400 ml. of the filtrate is added the equal quantity of acetone and allowed to cool overnight. The separated and solidified crystals of free base of dihydrodesoxystreptomycin are filtered and dried. They are neutralized with the 2 N methanolic solution of dried hydrogen chloride. The neutralized solution is poured into sevenfold quantity of dried acetone, the resulting precipitate is filtered, dried, and then dihydrodesoxystreptomycin hydrochloride is obtained.

Yield: 51.0 g., 89.2%; dihydrostreptomycin contents: 1.60% (therefore, purity of dihydrodesoxystreptomycin is 98.40%); potency: 880 u./mg.

Example 9

70 g. of hydroxystreptomycin of high purity (potency: 745 u./mg.) is dissolved in the 10% aqueous solution of $AlCl_3 \cdot 6H_2O$ (5.53% for $AlCl_3$). To this solution is added 7.8 g. of amalgamated aluminum and is reacted under stirring. After 6 hours of reaction maintaining the temperature of the reaction mixture at 45–50° C., the residual hydroxystreptomycin contents becomes below 1%, and the added amalgamated aluminum is almost dissolved. After the reaction is finished the solution is diluted with the equal quantity of distilled water. To this solution is added 75 g. of powdered silver carbonate and is thoroughly stirred and aluminum hydrochloride is removed as the precipitates of silver hydrochloride and aluminum hydroxide. The residue is thoroughly washed with distilled water. The filtrate and washings are combined, and concentrated under reduced pressure to a syrup-like state at 42–45° C. This syrup is dissolved in 300 ml. of dried methanol, and is poured into 2,000 ml. of dried acetone, the resulting precipitate is filtered, dried and then dihydrodesoxyhydroxystreptomycin hydrochloride is obtained.

Yield: 62.0 g., 91.6%; dihydrohydroxystreptomycin contents. 3.2% (therefore, purity of dihydrodesoxyhydroxystreptomycin is 96.8%); potency: 770 u./mg.

Analytical result.—Calculated for $C_{21}H_{41}N_7O_{12}\cdot 3HCl$: C=36.39%, H=6.40%, N=14.15%. Found: C=36.52%, H=6.51%, N=14.38%.

Example 10

As starting material, 90 g. of hydroxystreptomycin hydrochloride of impure quality (potency: 540 u./mg.) is employed. The reaction is executed exactly in the same way as in Example 9. After the reaction is finished, the silution is diluted with the equal quantity of distilled water. To this solution is added 190 g. of powdered silver carbonate and thoroughly stirred and aluminum and hydrochloride ions are removed completely. The residue is washed with distilled water thoroughly. The filtrate and washings are combined and concentrated under reduced pressure at 40–45° C. To 250 ml. of the concentrate is added hot aqueous solution of barium hydroxide and carbonate ion is removed. To 400 ml. of the filtrate is added the equal quantity of acetone and allowed to cool overnight. The separated and solidified crystals of free base of dihydrodesoxyhydroxystreptomycin are filtered and dried. They are neutralized with 2 N methanolic solution of dried hydrogen chloride. By adding the neutralizate to the sevenfold dried aceton, a precipitate results. This precipitate is filtered and dried, and then dihydrodesoxyhydroxystreptomycin hydrochloride is obtained.

Yield: 53.0 g., 87.3%; dihydrostreptomycin contents: 2.2% (therefore, purity of hydrodesoxyhydroxystreptomycin is 97.8%); potency: 800 u./mg.

Example 11

70 g. of mannosidostreptomycin hydrochloride of high purity (potency: 225 u./mg.) is dissolved in 200 ml. of the 10% aqueous solution of $AlCl_3\cdot 6H_2O$ (5.53% for $AlCl_3$). To this solution is added 7 g. of amalgamated aluminum and reacted under stirring. After 6 hours of the reduction maintaining the temperature of the reaction mixture at 45–50° C., the residual mannosidostreptomycin contents in the reaction mixture become below 1%, and the added amalgamated aluminum is almost dissolved. After the reaction is finished, the mixture is diluted with the equal quantity of distilled water, and, after being added 50 g. of powdered silver carbonate and thoroughly stirred, the aluminum hydrochloride in the solution is removed as the precipitates of silver hydrochloride and aluminum hydroxide. The precipitate is washed with distilled water, and the filtrate and washings are combined and concentrated under reduced pressure at 42–45° C. and made into a syrup-like state. The syrup is dissolved in 200 ml. of dried methanol and added dropwise to 1,200 ml. of dried acetone. Then, dihydrodesoxymannosidostreptomycin hydrochloride is precipitated, filtered and dried.

Yield: 62.0 g., 90.5%; dihydromannosidostreptomycin contents: 3.3% (therefore, purity of dihydrodesoxymannosidostreptomycin is 96.7%); potency: 230 u./mg.

Analytical result.—Calculated for $C_{27}H_{51}N_7O_{16}\cdot 3HCl\cdot H_2O$

C=37.72%, H=6.59%, N=11.44%. Found: C=37.43%, H=6.47%, N=11.24%

Example 12

As starting material, 90 g. of mannosidostreptomycin hydrochloride (potency: 140 u./mg.) is employed. The reaction is executed exactly in the same way as in Example 11. After the reaction is finished, the solution is diluted with the equal quantity of distilled water. To this solution 140 g. of powdered silver carbonate is added and thoroughly stirred, and hydrochloric and aluminum ions are removed completely. The residue is washed with distilled water thoroughly. The filtrate and washings are combined and are concentrated under reduced pressure at 42–45° C. To 200 ml. of the concentrate is added hot aqueous solution of barium hydroxide to remove carbonate ion. To 300 ml. of the filtrate is added the equal quantity of acetone and allowed to cool overnight. The crystals of free base of separated and solidified dihydrodesoxymannosidostreptomycin are filtered and dried, and neutralized with the 2N methanolic solution of dried hydrogen chloride. The neutralizate is poured into sevenfold quantity of dried acetone the resulting precipitate is filtered, dried, and then dihydrodesoxymannosidostreptomycin hydrochloride is obtained.

Yield: 46.5 g., 86.7%; dihydromannosidostreptomycin contents: 2.3% (therefore, purity of dihydrodesoxymannosidostreptomycin is 97.7%); potency: 235 u./mg.

Example 13

70 g. of streptomycin hydrochloride calcium chloride complex salt of high quality (potency: 770 u/mg., purity: 98.7%) is dissolved in 300 ml. of the 10% aqueous solution of $AlCl_3\cdot 6H_2O$ (5.5% for $AlCl_3$). To this solution is added 8.1 g. of amalgamated aluminum and reacted under stirring. After 5.5 hours of reaction maintaining the temperature at 50–55° C., the residual streptomycin contents of the solution become below 1%, and the added amalgamated aluminum is almost dissolved. After the reaction is finished, the solution is diluted with the double quantity of distilled water. To this solution is added 80 g. of powdered silver carbonate and thoroughly stirred to remove aluminum, calcium and chlorions. The residue is washed with distilled water thoroughly. The filtrate and washings are combined and concentrated under reduced pressure at 42–45° C. until the solution takes a syrup-like state. The syrup is dissolved in 300 ml. of dried methanol and this solution is added dropwise to 2,000 ml. of dried acetone, then dihydrodesoxystreptomycin hydrochloride is precipitated. This precipitate is filtered, washed and dried.

Yield: 59.5 g., 93.8%, dihydrostreptomycin contents: 2.4% (therefore, purity of dihydrodesoxystreptomycin is 97.6%); potency: 250 u./mg.

Analytical result.—Calculated for $C_{21}H_{41}N_7O_{11}\cdot 3HCl$:

C=37.26%, H=6.55%, N=14.48%

Found: C=37.18%, H=6.38%, N=14.37%.

Example 14

As starting material, 90 g. of streptomycin hydrochloride calcium chloride complex salt of impure quality (potency: 530 u./mg., purity: 68%) is employed. The reaction is executed exactly in the same way as in Example 13. After the reaction is finished, the solution is diluted with the double quantity of distilled water. To this solution is added 200 g. of powdered silver carbonate and thoroughly stirred to remove aluminum, calcium and hydrochloride ions as precipitates. The precipitate is washed thoroughly with distilled water. The filtrate and washings are combined and concentrated under reduced pressure at 42–450 C. to 250 ml. of the concentrate is added hot aqueous solution of barium hydroxide to remove carbonate ion. To 400 ml. of the filtrate is added the equal quantity of acetone and allowed to cool overnight. The crystals of free base of separated and solidified dihydrodesoxystreptomycin are filtered and dried, and neutralized with the 2 N methanolic solution of dried hydrogen chloride. The neutralizate is added dropwise to the sevenfold quantity of dried acetone and precipitated as dihydrodesoxystreptomycin hydrochloride. The precipitate is filtered and dried.

Yield: 49.5g., 90.3%; dihydrostreptomycin contents: 1.65% (therefore, purity of dihydrodesoxystreptomycin is 98.35%); potency: 870 u./mg.

Modifications may be made in carrying out the present invention without departing from the spirit and scope thereof, and our invention is to be limited only by the appended claims.

We claim:

1. Dihydrodesoxyhydroxystreptomycin in which the third carbon atom of the streptose chain comprises the group

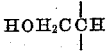

2. Dihydrodesoxymannosidostreptomycin in which the third carbon atom of the streptose chain comprises the group

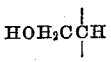

3. Dihydrodesoxyhydroxystreptomycin sulfate in which the third carbon atom of the streptose chain comprises the group

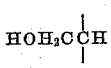

4. Dihydrodesoxyhydroxystreptomycin hydrochloride in which the third carbon atom of the streptose chain comprises the group

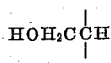

5. Dihydrodesoxymannosidostreptomycin sulfate in which the third carbon atom of the streptose chain comprises the group

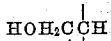

6. Dihydrodesoxymannosidostreptomycin hydrochloride in which the third carbon atom of the streptose chain comprises the group

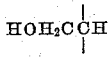

7. The process of reducing a streptomycin compound selected from the group consisting of streptomycin, hydroxystreptomycin, and mannosidostreptomycin to produce the corresponding dihydrodesoxystreptomycin compound, which comprises dissolving a salt of said streptomycin compound selected from the group consisting of the sulfate salt, the hydrochloride salt, and the hydrochloride calcium chloride complex salt in an aqueous solution containing an acid salt selected from the group consisting of aluminum sulfate and aluminum chloride in an amount to impart a pH of less than about 2.6 to said solution, contacting said solution with amalgamated aluminum to reduce the said streptomycin compound to the corresponding dihydrodesoxystreptomycin compound in which the third carbon atom in the streptose chain comprises the group

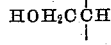

8. In the process as defined in claim 7, wherein after the reductive reaction is finished, crystalline dihydrodesoxystreptomycins are obtained by removing acid and metallic ions from the reaction mixture and concentrating the resultant solution.

9. In the process as defined in claim 7, wherein after the reductive reaction is finished, crystalline dihydrodesoxystreptomycins are obtained by removing acid and metallic ions from the reaction mixture and adding acetone to the resultant solution.

References Cited in the file of this patent
UNITED STATES PATENTS
2,803,650    Yabuta et al. _____ Aug. 20, 1957

UNITED STATES PATENT OFFICE
CERTIFICATE OF CORRECTION

Patent No. 3,049,535                                          August 14, 1962

Teijiro Yabuta et al.

It is hereby certified that error appears in the above numbered patent requiring correction and that the said Letters Patent should read as corrected below.

Column 6, line 18, for "75" read -- 755 --; line 66, for "845" read -- 843 --; column 10, line 54, for "250" read -- 850 --.

Signed and sealed this 18th day of December 1962.

(SEAL)
Attest:

ERNEST W. SWIDER
Attesting Officer

DAVID L. LADD
Commissioner of Patents